C. H. ALLEN.
SIGNALING DEVICE FOR VEHICLES.
APPLICATION FILED AUG. 11, 1916.
1,330,774.
Patented Feb. 17, 1920.
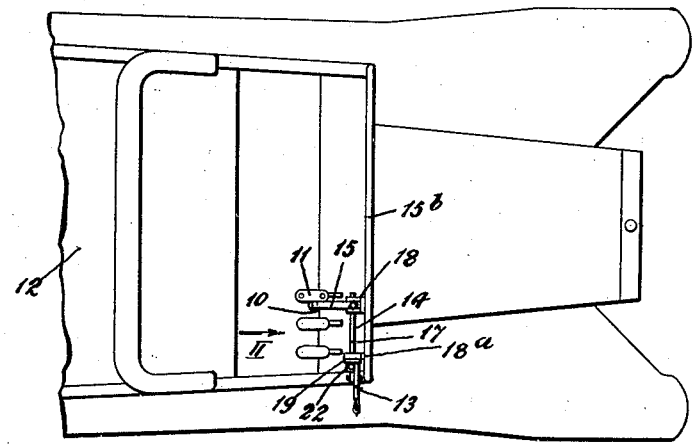
Fig. 1
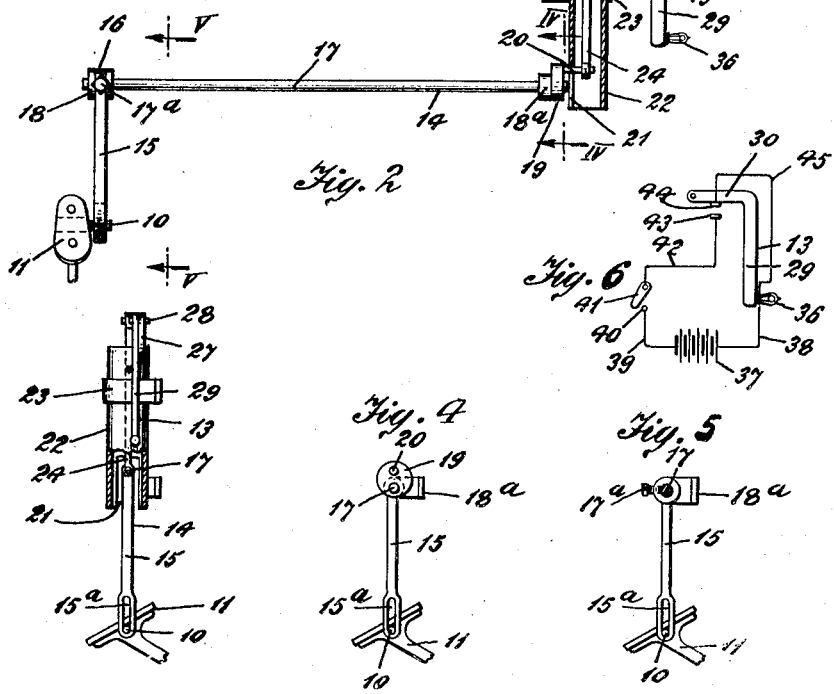
Fig. 2
Fig. 3  Fig. 4  Fig. 5
Inventor
Charles H. Allen
By his Attorney
W. T. Criswell

UNITED STATES PATENT OFFICE.

CHARLES H. ALLEN, OF OAKLAND, NEW JERSEY.

SIGNALING DEVICE FOR VEHICLES.

1,330,774.  Specification of Letters Patent.  Patented Feb. 17, 1920.

Application filed August 11, 1916. Serial No. 114,406.

*To all whom it may concern:*

Be it known that I, CHARLES H. ALLEN, a citizen of the United States, and a resident of Oakland, in the county of Bergen and State of New Jersey, have invented a certain new and useful Improvement in Signaling Devices for Vehicles, of which the following is a full, clear, and exact specification.

This invention relates to a class of devices adapted to be used especially in conjunction with automobiles.

My invention has for its object primarily to provide a device adapted to be employed on an automobile and like vehicle whereby a signal will be displayed for observation when the foot pedal of the clutch is actuated to check the driving mechanism of the vehicle, in order to avoid accidents by indicating that the vehicle is about to be slowed, or brought to a standstill, or when guided to turn a corner. The invention consists essentially of a signal designed to be applied to a vehicle so as to be normally obscured from view, and to the signal is connected mechanism adapted to be operated by the pedal of the clutch of the driving mechanism of the vehicle whereby the signal will be disposed exteriorly of the vehicle for observation when the clutch is actuated to check the travel of the vehicle.

Other objects of the invention are to provide on the signal an electric lamp adapted to be lighted when the signal is operated to display a warning at night; to provide an electric circuit for lighting the lamp; and to provide a switch which is operable when the signal is operated for opening and closing the circuit whereby the lamp may be lighted and extinguished.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is a fragmentary view looking down on the front of an automobile showing one form of signaling device embodying my invention applied to the clutch of the driving mechanism of the vehicle.

Fig. 2 is an enlarged side elevation, partly in section, of the device looking in the direction of the arrow indicated at I—I Fig. 1.

Fig. 3 is a fragmentary view, partly broken away, looking at one end of the device.

Fig. 4 is a detail fragmentary view taken on the line IV—IV of Fig. 2.

Fig. 5 is a fragmentary view, partly in section, taken on the line V—V of Fig. 2, and Fig. 6 is a diagrammatic view of the electric circuit and lamp used in the device.

When the signaling device is applied to an automobile or like vehicle a pin, as 10, is provided on the foot pedal 11 of the usual clutch, not shown, for operating the driving apparatus of the vehicle, and this pin is arranged so as to extend laterally from the foot pedal toward one side of the body, as 12, of the vehicle preferably in proximity to the customary steering wheel, the device including a signal, as 13, and mechanism, as 14, for operating the signal when the foot pedal is actuated, as will be hereinafter more fully described.

The mechanism 14 consists of a bar, or rod 15 disposed upwardly in the forward part of the body of the vehicle preferably on an incline, and this bar has a slotted lower end $15^a$ which is movably guided over the pin 10 of the foot pedal 11 so that the lower end of the rod will be swung forwardly and backwardly with the corresponding movements of the foot pedal when accordingly moved. The rod 15 may be of a length to extend to the upper part of the dash board, as $15^b$, of the body of the vehicle, and on the upper end of this rod is a ring 16 which is movably guided over a shaft, or rod 17 having one of its ends journaled in a bracket, or bearings, as 18, extending from the dash board $15^b$ of the vehicle, the ring 16 being held against movement on the shaft 17 by a set screw $17^a$. The shaft 17 is longitudinally disposed as well as being of a length to extend to the side of the body 12 contiguous to the steering wheel of the vehicle, and the second end part of the shaft is journaled in another bearing, as 18ª, also extending from the dash board 15ᵇ. On the end of the shaft 17 adjacent to the bearing 18 is rigidly held an eccentric 19, and projecting from the eccentric is a pin 20 arranged to circumscribe the radius of a circle when the shaft and the eccentric are rotatably moved. The free end of the pin 20 extends through a slot 21 provided in a casing 22 which is preferably of a tubular form disposed vertically with respect to the longitudinal shaft 17, and this tubular casing may be fixed to the side of the automobile body nearest to the foot pedal of the clutch by one or more brackets, or straps, as 23. Over the pin 20 interiorly of the casing 22 is rotatably guided the lower apertured end of a rod 24 extending upwardly in the casing, and the upper end of this rod is pivoted, as 25, to the lower end of a link 26 projecting somewhat above the casing. Extending from the casing 22 is an arm, or bracket 27 which is spaced from the link 26, and the upper end of this arm is on alinement with the upper end of the link.

To the upper end of the link 26 of the rod 24 is pivoted, at 28, one end of the signal 13, adapted to be displaced when the pedal of the clutch of the driving mechanism 14 of the vehicle is actuated to check the travel of the vehicle. The signal 13 may be of any desired form, preferably of substantially the shape of an inverted L to provide a vertically disposed arm, or plate 29, and a longitudinal arm 30. The arm 29 may be of any suitable color to make it easily observable, and in the center of the longitudinal arm is a slot 32 in which is a pin 33 projecting from the bracket 27 of the casing 22 so that the signal 13 may be moved in a rocking manner to swing its vertical arm in upward and downward direction.

The device when thus applied to an automobile or like vehicle, the signal 13 is normally obscured, or is not set by being disposed so that its arm 29 is depending downwardly alongside the body of the vehicle, and to set the signal for observation to give an alarm when the vehicle is slowed, or brought to a standstill, or when turning a corner it is usual to force the foot pedal 14 to partially, or entirely disengage the connection of the clutch from the engine, or driving apparatus of the vehicle. With this forward movement of the foot pedal and the pin 10 the rod 15 will be also moved forwardly to impart a partial rotation of the shaft 17, and the eccentric 19 with its pin 20 will likewise be partially revolved. The bar, or rod 24 with the link 26 will then be guided downwardly, and the signal 13 will be set by its arm 30 being also moved downwardly while its arm 29 will be swung upwardly at an angle so as to extend outwardly from the body of the vehicle, as indicated in dotted lines at 34.

A readily observable warning will thereby be given to persons that the course of travel of the vehicle is about to be changed, or that the vehicle is about to be brought to a standstill, and in order that the signal may be observed at night when set, on the signal may be provided a lamp, as 35, of a type preferably lighted from an electric circuit, as 36, leading from any suitable source of supply, for instance a battery, as 37. The circuit 36 consists of a wire 38 leading from one terminal of the battery to one pole of the lamp, and from the second terminal of the battery is a wire 39 leading to a contact 40 adapted to be engaged by a switch 41 for closing and opening the circuit. From the switch 41 is a wire 42 leading to one member 43 of a contact switch provided on the upper end of the casing 22, and the member of the contact switch is in the path of movement of a second member 44 of the switch, this second member being arranged on the arm 30 of the signal 13. From the second member 44 of the contact switch is a wire 45 leading to the second pole of the lamp 36 so that when the switch 41 is moved into engagement, for example at night, with the contact 40, and the device is operated as above described for displaying the signal, the members 43 and 44 of the contact switch will also be in engagement. The circuit will then be closed by the current passing from the battery 37 over the wire 38 to the lamp 36, and from the battery to the contact 40, through the switch 41, over the wire 42, through the engaged members 43 and 44 of the contact switch, over the wire 45, and through the lamp 36. In this manner the lamp 36 will be lighted with each setting of the signal 13, and by disengaging the switch 41 with the contact 40 the circuit will be opened to prevent the lamp from being lighted especially during the daylight.

In the foregoing description, I have embodied the preferred form of my invention, but I do not wish to be understood as limiting myself thereto, as I am aware that modifications may be made therein, without departing from the principle, or sacrificing any of the advantages of this invention, therefore I reserve to myself the right to make such changes as fairly fall within the scope thereof.

Having thus described my invention, I claim as new and desire to secure by Letters Patent:—

The combination, in a signaling device, with a tubular casing fixed on the body of a vehicle, having a signal adapted to be raised for observation and lowered for being obscured, of a reciprocable rod in the casing for operating the signal, a partially turnable shaft operatively connected to the rod for reciprocating the rod, and means connecting the shaft to the pedal of the vehicle for causing the shaft and rod to be operated to set the signal when the pedal is operated.

This specification signed and witnessed this tenth day of August, A. D. 1916.

CHARLES H. ALLEN.

Witnesses:
GEORGE F. BENTLEY,
C. SHIEGLEY.